United States Patent [19]

Yamashita

[11] Patent Number: 4,953,628
[45] Date of Patent: Sep. 4, 1990

[54] LATENT HEAT STORAGE APPARATUS

[75] Inventor: Kazuo Yamashita, Ikoma, Japan

[73] Assignee: Matsushita Electric Industrial Co., Ltd., Osaka, Japan

[21] Appl. No.: 234,777

[22] Filed: Aug. 22, 1988

Related U.S. Application Data

[62] Division of Ser. No. 62,650, Jun. 16, 1987, Pat. No. 4,817,704.

[30] Foreign Application Priority Data

| Jun. 17, 1986 | [JP] | Japan | 61-140757 |
| Jul. 30, 1986 | [JP] | Japan | 61-179074 |
| Oct. 20, 1986 | [JP] | Japan | 61-248724 |

[51] Int. Cl.$^5$ ............................................. F28D 20/00
[52] U.S. Cl. ....................................... 165/10; 126/263; 126/400
[58] Field of Search ................... 165/10; 126/263, 400

[56] References Cited

U.S. PATENT DOCUMENTS

| 4,332,690 | 6/1982 | Kimura et al. | 165/10 |
| 4,561,493 | 12/1985 | Yanadori et al. | 165/10 |

FOREIGN PATENT DOCUMENTS

| 126979 | 5/1976 | Japan . |
| 16035 | 2/1980 | Japan . |
| 41325 | 3/1980 | Japan . |
| 58-10104 | 2/1983 | Japan . |
| 59-19693 | 5/1984 | Japan . |
| 1426065 | 2/1976 | United Kingdom . |
| 1557938 | 12/1979 | United Kingdom . |

Primary Examiner—Albert W. Davis, Jr.
Attorney, Agent, or Firm—Pollock, VandeSande & Priddy

[57] ABSTRACT

A latent heat storage apparatus for obtaining sure latent heat from a latent heat storage material includes a plurality of small chambers for encasing at least the latent heat storage material. A capillary member is provided between the plurality of small chambers so that the contents of the plurality of chambers are coupled to each other. With this arrangement, the crystallization of the latent heat storage material in at least one small chamber is spread out into the other small chambers. In the case that the present invention is applied for a supercooling-prevention type heat storage apparatus, a supercooling-prevention material is encased in one of the small chambers. On the other hand, in the case that the present invention is applied for a supercooling type heat storage apparatus, one end portion of the capillary member is put out so that the latent heat storage material in the small chambers is crystallized by stimulation of the end portion thereof.

2 Claims, 6 Drawing Sheets

LATENT HEAT STORAGE APPARATUS

This is a division of application Ser. No. 062,650, filed on June 16, 1987 now U.S. Pat. No. 4,817,704 granted on April 4, 1989.

BACKGROUND OF THE INVENTION

The present invention relates generally to a supercooling-prevention type of supercooling type heat storage apparatus having a latent heat storage material for use in warming systems, heat retaining systems, heating systems and so on.

Latent heat storage materials are being used in hot-water supply and heating application because they have advantages of accumulating great amount of heat per unit of weight and constant heat output. In practical use, the heat storage material is divided into a number of portions which are in turn encased in a number of small bags. This is for preventing deviation of the heat storage material, for making constant the thickness of the apparatus to improve heating (heat storage) efficiency and, for use in a warming system, to provide flexibility for human wear. One example of conventional heat storage apparatus used in a heating system will hereinbelow be described with reference to FIGS. 1 and 2. In FIG. 1 and 2, a heat storage apparatus 1 has a number of small chambers 2 communicated with each other and a heating wire 3 provided for the small chambers 2 such that the lengths of the heating wire 3 for the respective smaller chambers 2 are equal to each other. The heat storage is effected by dissolution of the heat storage material resulting from energization of the heating wire 3. For use as a heating system, the heating wire 3 is covered by a thermal insulating material 6 as shown in FIG. 2 and each of the small chambers 2 encases a latent heat storage material 4 and a supercooling-prevention material 5 for avoiding the supercooling of the latent heat storage material 4. In the conventional apparatus, the control of the heat storage to a constant temperature is made by the energization and deenergization of the heating wire 3 and may be continued after the heat storage in some cases.

One important problem in the conventional arrangement is, however, that the temperatures in the small chambers 2 vary, depending on the located positions, that is, variations in temperature occuring among the small chambers 2 have a wide distribution. Since the supercooling-prevention material 5 does not act when the temperature exceeds its heat resisting temperature, it is required that the heating wire 3 is controlled so that the heating temperature is above the melting point $\theta 1$ of the latent heat storage material 4 and below the heat resisting temperature $\theta 2$ of the supercooling-prevention material 5. This temperature range ($\theta 2 - \theta 1$) is not wide. For example, of sodium acetate trihydrate is used as the latent heat storage material 4 and sodium pyrophosphate decahydrate is used as the supercooling-prevention material 5, the melting point $\theta 1$ is 58° C. and the heat resisting temperature $\theta 2$ is 80° C., that is, the range is about 20° C. Therefore, with the temperature variation of the heat storage apparatus widely occurring some temperatures exceed the range. To avoid going outside the range, it would be required that the heating wire 3 is controlled so that the temperature is gradually increased, resulting in a long time being taken for the heat storage. Furthermore, the temperature of the latent heat storage material 4 in the small chambers 2 covered by a thermal insulating member increases during the heat storage. In the case that a thermostat is used for detection of the temperature, when the small chambers 2 covered by the heat insulating member are in the vicinity of the thermostat, the temperature can be detected thereby. However, the temperatures of the small chambers 2 apart therefrom are difficult to detect and thus the temperatures of the farther small chambers 2 further increases. To increase the number of the thermostats is not desirable in practice. Although it is possible to use a temperature detecting wire as the temperature detecting device, the temperature detecting wire is difficult to partially detect the variations of temperatures. Thus, the temperature of some of the latent heat storage material 4 increases and exceeds the heat resisting temperature $\theta 2$ of the supercooling-prevention material 5. During the discharge of heat of the latent heat storage material 4, even if the temperature becomes below the melting point $\theta 1$, the supercooling phenomenon in which the latent heat is not discharged occurs.

The above description has been made in terms of an apparatus having heat storage material for allowing the prevention of supercooling wherein the heat storage material discharges heat in response to the termination of the heat storage and it is impossible to discharge the heat when required. Therefore, attempts to allow the discharge of heat when required have been made hitherto and one example of such techniques is disclosed in Japanese Patent Provisional Publication No. 61-14283 wherein a supercooling type heat storage material is used. However, although the supercooling type heat storage material is liquid during the heat storage or supercooling, it is turned into a solid after heat discharge, resulting in loss of flexibility. The technique to resolve this problem is disclosed in Japanese Utility Model Provisional Publication No. 57-87276 or 57-85154 wherein a plurality of small chambers is defined by a flexible sheet and a heat storage material is encased in the small chambers so that flexibility is provided by the turns of the coupling portions of the small chambers. However, the supercooling heat storage material requires a means for collapsing the supercooling to discharge heat as disclosed in Japanese Patent Provisional Publication No. 61-14283, 61-22194 or 60-1020. The Japanese Patent Provisional Publication No. 61-14283 discloses a supercooling-allowable heat storage component comprising hydroxylpropylated guagum. The heat storage component is supercooled in a glass bottle and, when heat is required a seed crystal is put therein or the heat storage component is stimulated by a metallic bar so as to collapse the supercooling to derive heat. The end of the metallic bar is sharp and therefore there is a safety problem. Furthermore, the heat storage component is apt to be leaked during the opening and closing of the vessel. The Japanese Patent Provisional Publication No. 61-22194 discloses a thermal energy storage device comprising an energy storage member and a stimulating member. The stimulating member comprising a seed crystal is brought into contact with the energy storage member which is in a supercooling state so that the supercooling is collapsed to derive heat energy. However, this device requires a means for providing the thermal insulation to aviod the melting of the seed crystal. The provision of the means makes the device large. Furthermore, the Japanese Patent Provisional Publication discloses a method wherein a bendable active strip encased in a receptacle is bent to collapse the supercooling state. However, a bending stress is frequently applied to the strip in response to the movement of the device, resulting in collapse of the supercooling when not required. In addition, it is actually difficult to provide such a stimulation means in each of the small chambers as disclosed in the Japanese Utility Model Provisional Publication Nos. 57-85154 and 57-87276.

SUMMARY OF THE INVENTION

The present invention has been developed in order to remove the above-mentioned drawbacks inherent to the conventional heat storage apparatus.

It is therefore an object of the present invention to provide a new and improved latent heat storage apparatus which is capable of providing flexibility and surely utilize the latent heat.

A feature of the present invention is that a plurality of small chambers is defined by partial connection between the upper portions and the lower portions of a receptacle and at least one heat storage material is encased in the plurality of the small chambers. This arrangement provides flexibility to the heat storage apparatus because the turns of the connected portions are allowable.

Another feature of the present invention is that the plurality of small chambers is arranged so as to communicate with each other through communicating passages so that the contents (heat storage material) in the plurality of small chambers are coupled to each other. This arrangement results in the fact that as long as at least one small chamber is not in the supercooling state even if most of the small chambers are in the supercooling state, the entire heat storage device does not enter into the supercooling state, resulting in shortening the heat storage time period and in obtaining heat from the heat storage device. That is, when the latent heat storage material in one small chamber is changed from a liquid to a solid (crystallization), this change is communicated with the adjacent small chambers through the communicating passages. Even if the latent heat storage material in the adjacent small chambers is in the supercooling state, the communication results in insertion of a seed crystal to collapse the supercooling state to discharge heat. This change successively communicates with the other small chambers and the heat storage device thus entirely discharges its heat.

In accordance with the present invention, there is provided a heat storage apparatus comprising a plurality of chambers for encasing at least a latent heat storage material and coupling means provided between the plurality of chambers so that the plurality of chambers is coupled to each other, a supercooling-prevention material being encased in at least one of the chambers.

In accordance with the present invention, there is also provided a heat storage apparatus comprising a receptable having therein a heat storage material for allowing supercooling and discharging latent heat by the phase change from liquid to solid in response to stimulation and a capillary member which extends from the inside of said receptacle to the outside thereof.

In accordance with the present invention, there is further provided a supercooling type heat storage apparatus comprising a plurality of chambers each having therein a heat storage material for allowing supercooling and discharging latent heat by the phase change from liquid to solid in response to stimulation and a capillary member provided to pass through said chambers.

Preferably, the communicating means is constructed of a capillary tube. In this case, even if all of the heat storage material in the plurality of chambers is in the supercooling state, it is possible to discharge the latent heat by stimulation of the capillary tube. Furthermore, even if an external force is applied to the heat storage apparatus, the latent heat storage material is difficult to leak to the outside.

When the heat storage device comprising the plurality of the small chambers and heat storage material encased therein is heated by a heater, the difference in temperature arises between the center portions and peripheral portions of the heat storage device. If the heat storage device is heated by the heater to store heat as quickly as possible with the temperature of one of the peripheral small chambers being set to be below the heat resisting temperature of a supercooling-prevention material, the temperature of the small chambers at the center portion becomes above the heat resisting temperature of the supercooling-prevention material and the supercooling state occurs in response to the heat discharge after the termination of the heating. According to the present invention, the small chambers at the peripheral portions do not enter into the supercooling state and the crystallization occurs in the vicinity of the melting point of the latent heat storage material. This crystallization is transferred to the small chambers at the center portion and hence the latent heat storage material does not become supercooled. This is achieved with a supercooling prevention material being encased in one of the small chambers at the peripheral portion. Furthermore, even in the case that some of the small chambers are covered by a heat insulating member, the crystallization in the small chambers which are not covered by the heat insulating material is transferred to the small chambers which are covered thereby. As result, even if the temperature in the covered small chambers exceeds the heat resisting temperature of the supercooling-prevention material due to the covering, the latent heat can be obtaiend from the covered small chambers.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Embodiment 1

Figure 3:
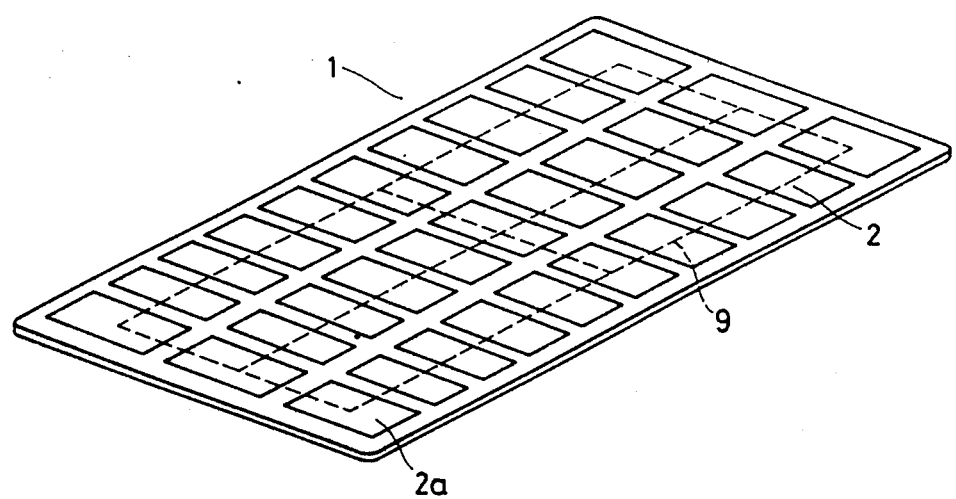
FIG. 3 is a perspective view of a heat storage apparatus according to first and second embodiments of the present invention.
Figure 4:
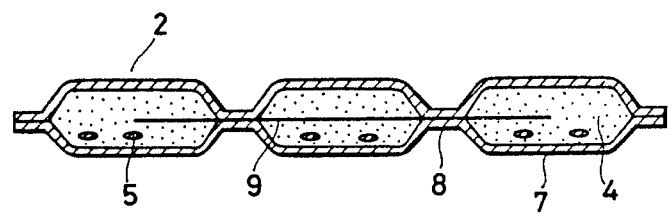
FIG. 4 is a cross-sectional view of the heat storage apparatus of FIG. 3.

A first embodiment of the present invention will hereinbelow be described with reference to FIGS. 3 and 4, FIG. 3 being a perspective view of a heat storage apparatus according to the first embodiment of the invention and FIG. 4 being a cross-sectional view of the heat storage apparatus incorporated into a heating apparatus. In FIGS. 3 and 4, the heat storage apparatus 1 comprises a plurality of small chambers 2 which are defined by division of the inner space of a flat receptacle 7 of a fusible film. The division is made by partial attachment of the upper surface and the lower surface of the flat receptacle. The reference numeral 8 represents adhesion portions. A latent heat storage material 4 and a supercooling-prevention material 5 are encased in each of the plurality of small chambers 2. Also included in the heat storage apparatus 1 is a communicating device 9 provided to pass through the plurality of small chambers 2 so that the contents (heat storage material 4) in the plurality of small chambers 2 are coupled to each other through the communicating device 9. In this embodiment, the communicating device 9 comprises a member such as yarn for allowing the capillary phenomenon. The heat storage material 4 in one small chamber 2 soaks into the communicating device 9 and is coupled to the heat storage material 4 in the adjacent small chamber 2. It is also appropriate that capillary tubes are used as the communicating device 9. In this case, each of the capillary tubes is provided between the small chambers 2.

The receptacle 7 is made of a flexible material such as aluminum-laminating film which is not reactive and compatible to the latent heat storage material 4. The receptable 7 may be made by heating attachment of a pair of film sheets, by heating attachment of a folded film sheet, or by heating attachment of the suitable portions of a tube. A description will hereinbelow be made in terms of the receptacle made of a pair of film sheets. The adhesion of the upper surface and lower surface of the receptacle 7 is made by heating. It is also appropriate that the adhesion is made using an adhesive bond. The small chambers can be determined in size and shape in accordance with the use purposes. The latent heat storage material 4 is of the hydrated salt suuch as calcium chloride hexahydrate, sodium sulfate decahydrate, sodium thiosulfate pentahydrate, or sodium acetate trihydrate. Because the latent heat storage material 4 enters into the supercooling state by heating over the melting point and cooling, a supercooling-prevention material is mixed therein. In addition, a viscosity increasing agent, a stabilizer or a heat-conduction material is mixed therein if required. The capillary member 9 is a fiber-made member which is not reactive and not compatible to the latent heat storage material 4. For example, the capillary member 9 is a yarn-like member made of a natural fiber such as cotton and cellulose or a synthetic fiber such as polyester, acrylic, polyamide and aromatic polyamide. It is also appropriate that the capillary member 9 is a woven fabric, non-woven fabric, a member made of fine metallic lines such as stainless steel line and copper line, or one of various types of continuous bubble members. The heating attachment is performed with the capillary member 9 being interposed between the two film sheets so that the capillary member 9 is fixed after the heating attachment. It is necessary that capillary member 9 with stand the heat for the heating attachment. If the capillary member 9 is melted into the receptacle 7, it does not function as the capillary and the latent heat storage material 4 liquid becomes difficult to permeate thereinto so that the collapse of the supercooling is terminated there. Therefore, it is preferable to use a yarn like member made of polyester or polyamide when the most-inner layer (heating attachment layer) of the laminating film is polyethylene, for example. The installing position and installing method of the capillary member 9 are not limited particularly and it is enough if it is arranged to perform the connection between the small chambers 2 through coupling portions 8.

Figure 1:
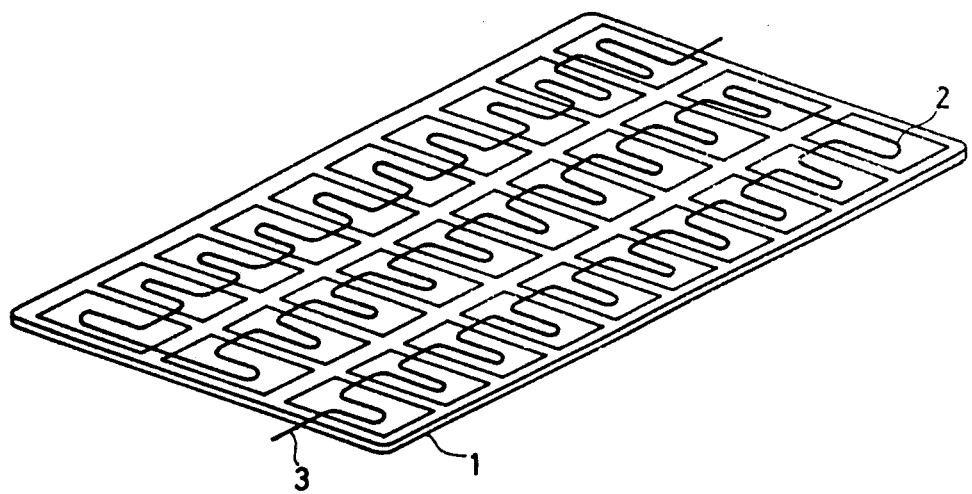
FIG. 1 is a perspective view of a conventional heat storage apparatus.
Figure 2:
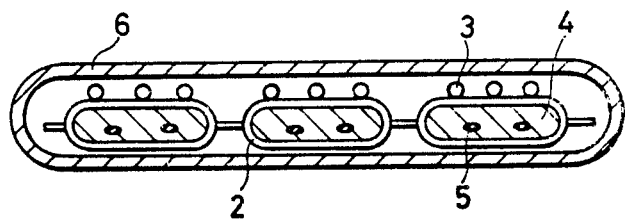
FIG. 2 is a perspective view of a heating apparatus including the conventional heat storage apparatus of FIG. 1.

As shown in FIG. 3, a yarn made of polyester as the capillary member 9 is interposed between two sheets of laminating films and the heating attachment thereof is effected to have bonding portions of a width of 5 mm so that a plurality of small chambers of 4×6 cm is defined. Before the heating attachment, the capillary member 9 is arranged so that the small chambers 2 are coupled to each other in at least one place. Sodium acetate trihydrate is encased as the latent heat storage material 4 in the small chambers 2. In addition, sodium pyrophosphate decahydrate, i.e., supercooling prevention material 5 is further encased in only the small chamber 2a. Thereafter, the openings of the small chambers 2 are closed under condition of decreased pressure. Thus, a heat storage device is constructed to have 30 small chambers 2, that is, 10 chambers per row and three rows. A heater as shown in FIG. 1 is provided to the heat storage device. A temperature control device is placed on the small chamber 2a, and with the temperature control being performed so that the temperature of the small chamber 2a exceeds 75° C., the energization of the heater (heat storage) is effected. In the temperature distribution of the heat storage device after the heat storage termination of the small chamber 2a, the temperature of the small chambers 2 at the corner portions is about 75° C., the temperature of the small chambers 2 at the peripheral portions other than the small chambers at the corner portions is 85° to 95° C., and the temperature of the small chambers 2 at the center portion is 90° to 100° C. If the small chambers 2 are completely independent of each other, these temperatures provide the supercooling for all of the small chambers 2 other than the small chamber 2a. Furthermore, the time period is half the time period taken in the conventional temperature-controlling type apparatus. The heat discharge is started immediately after the heat storage. The small chambers 2 at the corner portions have the greatest degree in the decreasing temperature and the small chambers 2 at the peripheral portion are second to the small chambers 2 at the corner portions. When the temperature is in the vicinity of the melting point of the latent heat storage material 4 in accordance with the temperature decrease, the phase change from liquid to solid occurs in the small chamber 2a, resulting in discharging heat. Secondly, when the temperature of the small chamber 2 adjacent to the small chamber 2a becomes below the melting point of the latent heat storage material 4, the phase change occurs in the adjacent small chamber 2. This phase change is transferred, or spread out, one after the other and the latent heat of the entire heat storage device could be obtained. Furthermore, during the heating, a force of 150 kg is applied to one of the small chambers 2. However, the heat storage material 4 in the force-applied small chamber 2 has not been transferred to the other chambers 2, because the movement of the latent heat storage material 4 is significantly limited by the receptacle 7.

Embodiment 2

As well as in the first embodiment, a heat storage device is constructed so as to have 30 small chambers, that is, 10 chambers per row and three rows. In this embodiment, sodium acetate trihydrate and sodium pyrophosphate decahydrate are encased in each of the small chambers and they are mixed with each other. In the case that the heat storage device is partially covered by a heat-insulating member during heat storage and the abnormality that the heat storage member is covered by the heat-insulating member is not detected sufficiently and the control is not effected, the temperature of the covered portion is greater and exceeds the heat-resisting temperature 80° C. of the supercooling-prevention material. If the small chambers are independent of each other, the supercooling occurs and thus it is impossible to obtain heat from the small chambers 2 at the covered portion. Therefore, according to this embodiment, because the contents (latent heat storage material 4) in the small chambers are coupled to each other through the capillary member 9, when the phase change from liquid to solid occurs during heat discharge in terms of the latent heat storage material 4 of the small chambers 2 which is not covered, the covered small chambers 2 adjacent thereto result in the phase change from liquid to solid through the capillary member 9, and this allows the latent heat of the latent heat storage material 4 to be obtained without the generation of supercooling. Although the above-description has been made in the case of the provision of the heater, it is also appropriate that the heating wire is not provided at a portion of the small chamber and the temperature control is effected at the portion. Furthermore, a similar effect can be obtained using heat wind or hot water in place of the heater. When the heat storage device is mounted on a human body, it is easily bent around the attachment portions and therefore the human does not feel incompatibility, resulting in good heating.

Embodiment 3

Figure 5:
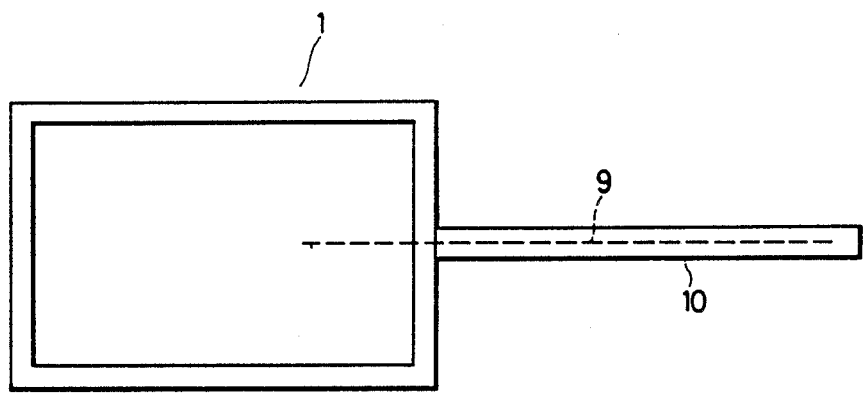
FIG. 5 is a plan view of a heat storage apparatus according to a third embodiment of the present invention.
Figure 6:
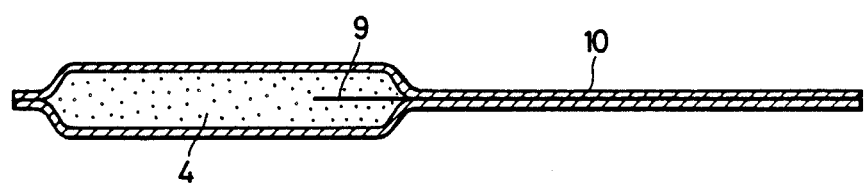
FIG. 6 is a cross-sectional view of the heat storage apparatus of FIG. 5.
Figure 7:
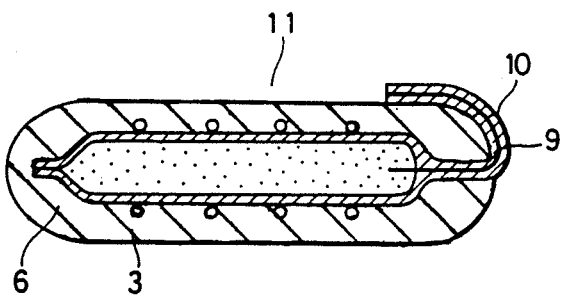
FIG. 7 is a cross-sectional view of a heating apparatus including the heat storage apparatus of FIG. 5.

As shown in FIGS. 5 and 6, a heat storage apparatus 1 has a capillary member 9 which is coupled from the inside to the outside. Sodium acetate trihydrate is used as a latent heat storage material 4 and polyester yarn is used as the capillary member 9. Because the length of the capillary member 9 is long, the capillary member 9 contains the sodium acetate in advance. The capillary member 9 is covered by a shell 10. If it is used several times, the shell 10 is not required. However, for increasing the number of uses, the shell 10 made of the same material as the receptacle is provided over the whole of the capillary member 9 not to result in composition change due to evaporation of water content. The receptacle and the shell 10 are bonded so that the entire heat storage apparatus 1 is in the sealed state. A wire 3 is provided thereto for heat storage and the circumference thereof is covered by a thermal-insulating material 6 so that a heating apparatus 11 as shown in FIG. 7 can be constructed. One end of the capillary member 9 is placed to the outside of the thermal-insulating material 6. When the heating apparatus 11 is heated by the wire 3, the temperature of the sodium acetate trihydrate has reached 90° C. and the heat storage has been effected. At this time, the temperature of the one end of the capillary member 9 placed outside the thermal-insulating material 6 is 35° C. which is lower than the melting point 58° C. of the sodium acetate trihydrate. When heat is discharged, the crystal remaining in the capillary member 9 is used as a seed crystal and heat can be obtained from the heat storage apparatus 1 in accordance with the progression of crystallization.

Embodiment 4

Figure 8:
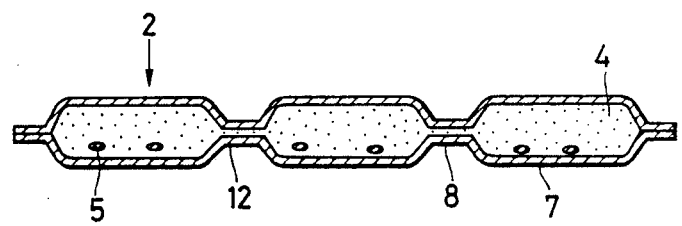
FIG. 8 is a cross-sectional view of a heat storage apparatus according to a fourth embodiment of the present invention.

Although in the first and second embodiments the small chambers are coupled to each other through the capillary member 9, in this embodiment, the capillary member 9 is not used and adhesion portions 8 for defining the small chambers are not completely adhered as shown in FIG. 8 so that the contents in the small chambers 2 are coupled to each other through the non-adhered portions 12. There is a close relationship between the dimension of the non-adhered portion 12 and the movement of the latent heat storage material 4 and it is preferable that the width of the non-adhered portion 12 is half the length thereof. When the width thereof is greater than half the length thereof, in response to application of a force to one small chamber 2 the latent heat storage material 4 in the force-applied small chamber 2 is easily moved to other small chambers 2, resulting in deviation of the amount of the latent heat storage material 4 in the small chambers 2. Furthermore, it is preferable that the width of the non-adhered portion 12 is below 10 mm because of the prevention of easy movement. With the above-mentioned arrangement, the heat storage device is heated by a heater as in the first embodiment. As a result, the crystallization occurs from the small chamber 2a, which is not in the supercooling state, to other small chambers 2 whereby latent heat can be obtained from the entire heat storage device.

Second, a description will hereinbelow be made in the case that the present invention is applied to a supercooling type heat storage apparatus. A latent heat storage material which discharges heat by the phase change effected in response to a stimulation is encased in one or a plurality of small chambers and the small chamber is provided with a capillary member which extends from the inside of the small chamber to the outside thereof. The supercooling of the latent heat storage material is collapsed by the stimulation of the capillary member. The stimulation of the capillary member results in the stimulation of the latent heat storage material.

Embodiment 5

Figure 9:
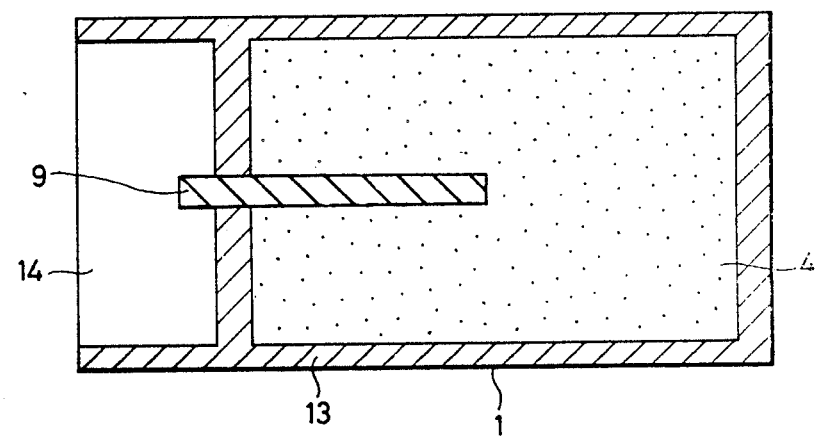
FIG. 9 is a cross-sectional view of a heat storage apparatus according to a fifth embodiment of the present invention.

A heat storage apparatus of this embodiment is shown in FIG. 9 as comprising a receptacle 13, a latent heat storage material 4 encased therein, and a capillary member 9 provided thereto. If required, the capillary member is covered by a cover 14.

The receptacle 13 is made of a material which is not reactive and not compatible with the latent heat storage material 4. If the heat storage apparatus is employed for a warming apparatus, an aluminium-laminating film may be used for providing flexibility. The latent heat storage material 4 is of the hydrated salt such as calcium chloride hexahydrate, sodium sulfate decahydrate, sodium thiosulfate pentahydrate, or sodium acetate trihydrate. In addition, a viscosity increasing agent, a stabilizer or a heat-conduction material is mixed therein if required. The capillary member 9 is a fiber-made member which is not reactive and not compatible to the latent heat storage material 4. For example, the capillary member 9 is a yarn-like member made of a natural fiber such as cotton and cellulose or a synthetic fiber such as polyester, acrylic, polyamide and aromatic polyamide. It is also appropriate that the capillary member 9 is a woven fabric, non-woven fabric, a member made of fine metallic lines such as stainless steel line and copper line, a continuous bubble member such as polyurethane, elastomer having continuous bubbles and metallic bubble body, or sinter having continuous bubbles such as polyethylene porous sinter and porous ceramic. The capillary member 9 is arranged such that one end thereof is outside the receptacle 13 and the other end thereof is brought into contact with the heat storage material 4 therein. The capillary member 9 draws up the latent heat storage material 4 by the contact therewith and is entirely soaked therein. In the case that the internal pressure of the receptacle 13 is increased by increase of the temperature during heat storage, the latent heat storage material 4 may be leaked out through the capillary member 9. Thus, it is required that the capillary member 9 is designed considering the kind of the latent heat storage material 4 and viscosity decrease due to temperature increase so that the leaking of the latent heat storage material 4 is substantially prevented.

The heat storage apparatus 1 is heated (heat-stored) by hot water or a heater. When the latent heat storage material 4 is cooled to the room temperature after being sufficiently melted, the latent heat storage material 4 becomes in the supercooling state. Here, the supercooling state is collapsed even if the heat storage apparatus 1 is shocked, bent or pressurized. For obtaining heat, a portion of the capillary member 9 provided outside the receptacle 13 is stimulated. That is, the surface of the capillary member 9, particularly the portion close to the receptacle 13, is stimulated by a bar-like member, thin member or a finger. If a seed crystal for the latent heat storage material 4 is attached to the stimulating member, the collapse of the supercooling is easily effected by light contact therewith. If the collapse of the supercooling is started at once, it is successively performed. That is, the collapse of the supercooling started at the stimulated portion is spread out, through the capillary member 9, all over the latent heat storage material 4 in the receptacle 13, resulting in obtaining heat from the latent heat storage material 4.

the cover 14 protects the capillary member 9 protruding from the receptacle 13 and prevents evaporation of water from the capillary member 9. This prevents the collapse of the supercooling which may be effected by an undersirable stimulation performed when the heat storage apparatus 1 is held or carried in the supercooling state. Furthermore, when the temperature of the heat storage apparatus 1 is increased during heat storage, the crystallization water of the latent heat storage material 4 is apt to be evaporated. The covering of the capillary member 9 results in prevention of the evaporation.

A detailed arrangement of the heat storage apparatus 1 will be made hereinbelow. Two aluminum-laminating films are prepared, and with them being piled up, the three sides thereof are heated to form a receptacle. A polyester yarn of 0.2 mm diameter used as the capillary member is interposed between the two aluminum-laminating films at the remaining side. The dimension of the receptacle is 100 mm × 120 mm, and the width of the heated portion is 5 mm. The length of the polyester yarn protruded from the receptacle is 20 mm and the length inside the receptacle is 50 mm. A cover for covering the capillary member is provided at the side in which the capillary member is placed. The cover is made of an aluminium-laminating film and the length thereof is 20 mm. For making the heat storage apparatus, a latent heat storage material of 40 g is encased in the receptacle. The capillary member protruded from the receptacle is put in the cover so that the whole thereof is covered thereby, followed by heating (heat storage). When the latent heat storage material is cooled to the room temperature after being sufficiently melted, the latent heat storage material enter into the supercooling state. The supercooling has not been collapsed by any external stimulations. The capillary member is stimulated by a stimulating bar with a seed crystal. As a result, the supercooling state collapses and heat could be obtained. The collapse by the stimulation is transferred through the polyester yarn to the heat storage material. Although the internal pressure is increased during the heating, the heat storage material has not been leaked out.

Embodiment 6

Figure 10:
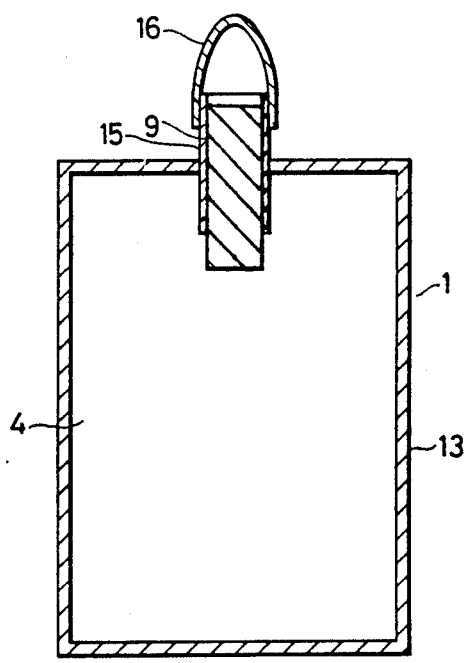
FIG. 10 is a cross-sectional view of a heat storage apparatus according to a sixth embodiment of the present invention.

A heat storage apparatus of this embodiment will be described with reference to FIG. 10. The heat storage apparatus 1 has a port 15 into which a capillary member is inserted and an opening and closing device 16 as shown in FIG. 10. A latent heat storage material 4 is encased in a receptacle 13.

The arrangement of the heat storage apparatus 1 will hereinbelow be described in detail. A polyethylene-made pipe having a polyethylene sinter therein as the capillary member 9 having a dimension of 100 mm × 120 mm and made of an aluminum-laminating film is adhered by heating to the receptacle 13. The opening and closing device 16 comprises a polyethylene-made cap for covering the polyethylene pipe to seal the receptacle 13. Sodium acetate trihydrate of 40 g is encased in the receptacle 13 and sealed up under the condition of decreased pressure so that the heat storage apparatus 1 can be constructed. The heat storage apparatus is soaked in hot water of 100° C. so that the latent heat storage material 4 is sufficiently melted, and it is cooled to the room temperature, and hence the latent heat storage material becomes in the supercooling state. The supercooling has not been collapsed by any of the stimulations. For obtaining heat, the cap 16 is removed from the receptacle 13 and the surface of the polyethylene sinter is stimulated lightly by a bar. The supercooling of the latent heat storage material 4 is easily collapsed by the stimulation. In this embodiment, when the heat storage apparatus 1 is not used, since it is covered by the cap 16, the supercooling state is not collapsed by an undesirable stimulation. Furthermore, the heat storage apparatus 1 is sealed up when heat-stored or kept, and therefore, the change of composition of the heat storage material due to evaporation of water does not occur. Even if the cap is removed, the latent heat storage material 4 is not leaked out because of interruption of the capillary member 9.

Embodiment 7

Figure 11:
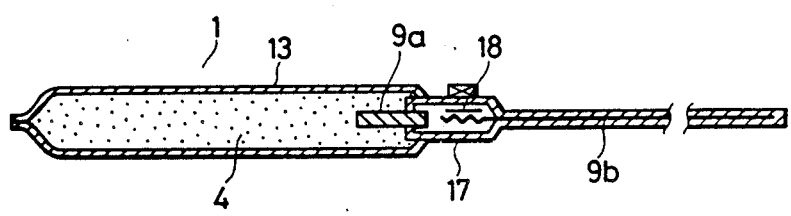
FIG. 11 is a cross-sectional view of a heat storage apparatus according to a seventh embodiment of the present invention.

A heat storage apparatus 1 according to this embodiment will hereinbelow be described with reference to FIG. 11. The heat storage apparatus 1 comprises a receptacle 13 having a latent heat storage material 4 therein and a capillary member 9 which extends from the inside of the receptacle 13 to the outside thereof. The capillary member 9 is separated into two portions 9a and 9b and a switching device 17 is provided therebetween so that the two portions 9a and 9b are switched into and out of contact with each other. The one end of the capillary member 9a is inserted into the receptacle 13 so that it is in contact with the latent heat storage material 4. Thus, the latent heat storage material 4 is soaked into the capillary member 9a, that is, the capillary member 9a carries the latent heat storage material 4. The latent heat storage material 4 is previously soaked into the capillary member 9b. The latent heat storage material 4 in the capillary member 9b is held by capillary phenomenon. While the latent heat storage material 4 in the capillary member 9a is melted during heat storage, the capillary member 9b is separated from a heater so that a portion of the latent heat storage material 4 in the capillary member 9 is not melted, i.e., remains in the crystal state. After the heat storage, the non-melted portion in the capillary member 9b results in a seed crystal and the latent heat storage material 4 in the capillary member 9b is entirely crystallized. On the other hand, the capillary member 9a does not contain the seed crystal and enters into the supercooling state. When a knob 18 of the switching device 17 is operated so that the capillary member 9b is moved into contact with the capillary member 9a, the supercooling state of the latent heat storage material 4 in the capillary member 9a collapses because the latent heat storage material 4 of the capillary member 9b acts as a seed crystal. This collapse is transferred through the capillary member 9a to the latent heat storage material 4 in the receptacle 13. As a result, the latent heat storage material 4 discharges heat by the phase change from liquid to solid.

Secondly, in the case that the receptacle 13 is divided into a plurality of small chambers for the purpose of providing flexibility to the heat storage apparatus 1, a description will be made in terms of a method for collapsing the supercooling state in each of the small chambers. A latent heat storage material 4 whose supercooling state is easily collapsed by stimulation is encased in each of the small chambers. The small chambers are coupled to each other through a capillary member. Cince the capillary member is in contact with the latent heat storage material in the small chambers, the latent heat storage material is soaked into the capillary member by capillary phenomenon, that is, the capillary member includes the latent heat storage material. Thus, although the receptacle is divided into the plurality of small chambers, the contents in the small chambers are connected to each other through the capillary member. When a stimulating member provided in one of the small chambers is operated, the supercooling state of the latent heat storage material in the small chamber is collapsed and the latent heat storage material discharges heat by the phase change from liquid to solid. After entirely collapsed in a small chamber, the collapse of the supercooling is transferred through the latent heat storage material via the capillary member to the latent heat storage material in the adjacent small chambers so that the latent heat storage material in all of the small chambers is collapsed. That is, the collapse of the supercooling in one small chamber results in the collapse of the supercooling in all of the small chambers by means of the capillary member.

Embodiment 8

Figure 12:
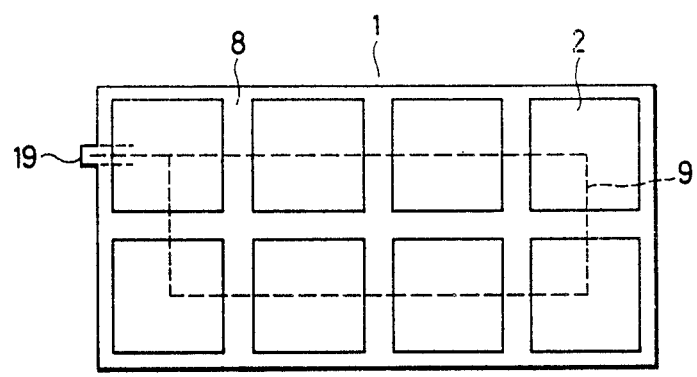
FIG. 12 is a plan view of a heat storage apparatus according to a eighth embodiment of the present invention.
Figure 13:
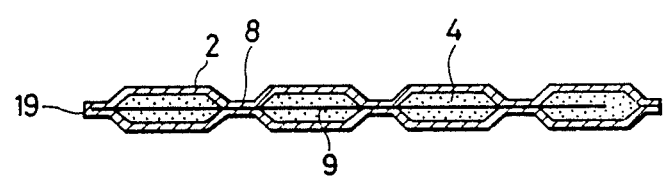
FIG. 13 is a cross-sectional view of the heat storage apparatus of FIG. 12.

A further embodiment of the present invention will be described with reference to FIGS. 12 and 13. FIG. 12 is a plan view of a heat storage apparatus according to this embodiment and FIG. 13 is a cross-sectional view of the heat storage apparatus of FIG. 12. The heat storage apparatus 1 has a plurality of small chambers 2 which are defined by partially adhesion of a receptacle made of films or a tube. A latent heat storage material described in the first embodiment is encased in each of the small chambers 2 and the small chambers are coupled to each other through a capillary member 9. A description of the heat storage apparatus 1 will hereinbelow be made in detail.

A yarn made of polyester is, as the capillary member 9, interposed between two aluminium-laminating films which are made of polyethylene, and the aluminium-laminating films are partially adhered by heating so that a plurality of small chambers 2 are defined by the adhesion portions 8. The width of the adhesion portions 8 is 5 mm and the dimension of each of the small chambers is $5 \times 5$ cm. The capillary member 9 is arranged so that the small chambers 2 are coupled in one place to each other through the capillary member 9 upon heating. Sodium acetate trihydrate of 20 g, i.e., latent heat storage material 4, is encased in each of the small chambers 2 and after encased, the small chambers 2 are sealed up under the condition of decreased pressure, thereby defining 30 small chambers, 4 chambers per row and two rows. A stimulating member 19 is provided for one of the small chambers 2. The heat storage apparatus 1 is heated to 80° C. higher than the melting point 58° C. of the sodium acetate trihydrate. After the latent heat storage material 4 has been melted completely, it is cooled to the room temperature whereby the latent heat storage material 4 easily enters into the supercooling state. The force of 150 Kg has been applied to one of the small chambers 2 during the heating. However, the latent heat storage material in the small chamber 2 has been transferred to other chambers 2. This is because the movement of the latent heat storage material 4 is extremely limited by the capillary member 9. The supercooling state is collapsed by stimulating the stimulating member 19 whereby heat can be obtained from the whole of the heat storage apparatus 1. Even if the heat storage apparatus is mounted on a human body, there is no feeling of incompatibility because of rotations about the adhesion portions 8.

Embodiment 9

In this embodiment, as well as in the fourth embodiment, each adhesion portion is not adhered completely so that the contents (latent heat storage material) in the small chambers are coupled to each other through the non-adhered portions. As shown in FIG. 12, a stimulating member is provided for one of the small chambers.

In response to stimulation of the latent heat storage material in the small chamber by the stimulating member, as well as in the eighth embodiment, the supercooling state is collapsed and heat can be obtained from the heat storage apparatus.

In the above-description, the embodiments 1, 2, 3 and 4 respectively represent a supercooling-prevention type heat storage apparatus. According to these apparatus, a latent heat storage material is encased in a plurality of small chambers and the plurality of small chambers is coupled to each other, for example, a capillary member so that the contents in the small chambers are substantially coupled to each other. Therefore, even if one small chamber is not in the supercooling state and the latent heat storage material in the one small chamber results in the phase change from liquid to solid, the phase change is transferred to the whole of the heat storage apparatus whereby latent heat can be obtained from the entire apparatus. Therefore, the temperature in the other small chambers is allowed to exceed the heat-resisting temperature of a supercooling-prevention material and it is possible to set the heating temperature to a temperature higher than the melting point of the latent heat storage material, thereby shortening the time period of heat storage. Furthermore, in the case that the heat storage apparatus is mounted on a human body, the adhesion portions between the small chambers are turned easily and hence there is no feeling of incompatibility. In addition, in the case that the small chambers are coupled to each other through a capillary member, even if a great force is applied to one of the small chambers, the latent heat storage material in the small chamber is not substantially transferred to the other chambers because the movement of the latent heat storage material is interrupted by the capillary member.

On the other hand, the embodiments 5, 6, 7, 8 and 9 respectively represent a supercooling type heat storage apparatus. According to the supercooling type heat storage apparatus, a plurality of small chambers is defined and the plurality of small chambers is coupled to each other through a capillary member, for example. The supercooling state of the latent heat storage material in one small chamber is collapsed by stimulation. This collapse of the supercooling results in obtaining latent heat from the whole of the heat storage apparatus because of spread to the latent heat storage material in the other small chambers. The flexibility of the heat storage apparatus is easily achieved by turns of the adhesion portions between the small chambers.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A heat storage apparatus comprising a receptacle filled with a heat storage material for allowing supercooling and discharging latent heat by a phase change from liquid to solid in response to stimulation, said receptacle being provided with a port, a capillary member to be stimulated being tightly fitted in said port and having a portion thereof embedded in said heat storage material, and said port being covered with a removable cap for preventing said capillary member from being exposed to the outside air and from being accidentally stimulated, wherein, for obtaining heat, said removable cap is removed from the receptacle and said capillary member is stimulated.

2. A heat storage apparatus as claimed in claim 1, wherein said capillary member is a yarn-like member.

* * * * *